United States Patent
Hunt et al.

(10) Patent No.: US 7,219,398 B1
(45) Date of Patent: May 22, 2007

(54) FLEXIBLE LOOP BUNGEE CORD TERMINUS

(75) Inventors: Raymond N. Hunt, Glastonbury, CT (US); Ricky W. Selby, Danielson, CT (US)

(73) Assignee: Keeper Corporation, North Windham, CT (US)

( * ) Notice: Subject to any disclaimer, the term of this patent is extended or adjusted under 35 U.S.C. 154(b) by 0 days.

(21) Appl. No.: 11/226,119

(22) Filed: Sep. 14, 2005

(51) Int. Cl.
*A44B 21/00* (2006.01)
*F16B 45/00* (2006.01)

(52) U.S. Cl. .................................. 24/115 R; 24/265 AL

(58) Field of Classification Search .............. 24/115 R, 24/265 H, 265 AL, 298, 300
See application file for complete search history.

(56) References Cited

U.S. PATENT DOCUMENTS

| 3,253,308 | A | * | 5/1966 | Jost ............................ 403/213 |
| 4,653,422 | A | * | 3/1987 | Allen ........................ 24/129 R |
| 4,671,695 | A | * | 6/1987 | Scotti ...................... 24/265 AL |
| 5,317,788 | A | * | 6/1994 | Esposito et al. .............. 24/300 |
| 6,851,163 | B2 | * | 2/2005 | Selby ........................... 24/130 |
| 6,874,207 | B2 | * | 4/2005 | Goch ........................ 24/136 R |

* cited by examiner

*Primary Examiner*—Robert J. Sandy
(74) *Attorney, Agent, or Firm*—M. P. Williams

(57) ABSTRACT

A terminus (8) for a bungee cord (9) comprises a molded base (10) having a flexible loop (11) anchored by a compression sleeve secured to one end; a free end (23) of the loop has an enlargement (22) which fits through a hole (20) into an enlarged portion (17) of a slot (15), thereby to retain the free end of the loop when the loop is under tension. The loop may be plastic coated aircraft cable. One embodiment includes a cleat (28) to permit adjusting the position of the terminus on the bungee cord, but the bungee cord may be fixed to the terminus if desired.

3 Claims, 1 Drawing Sheet

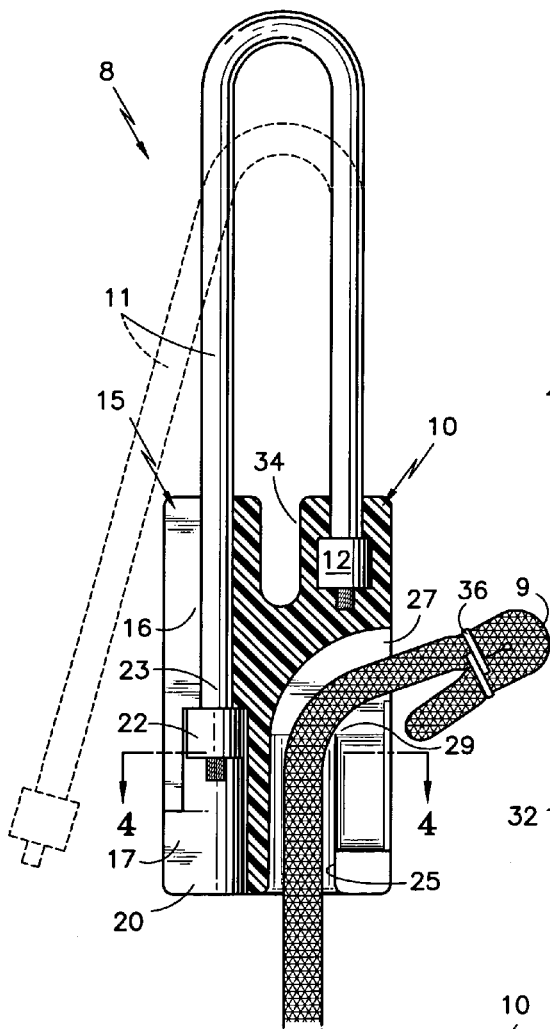
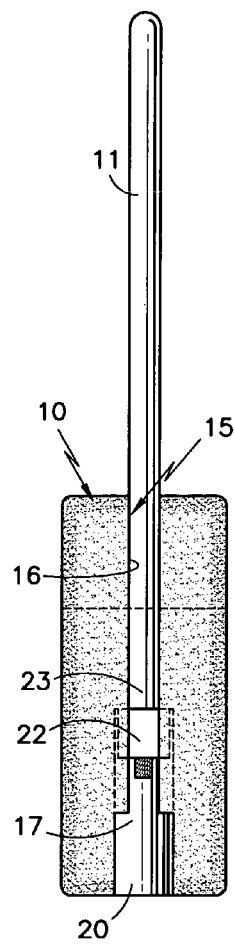
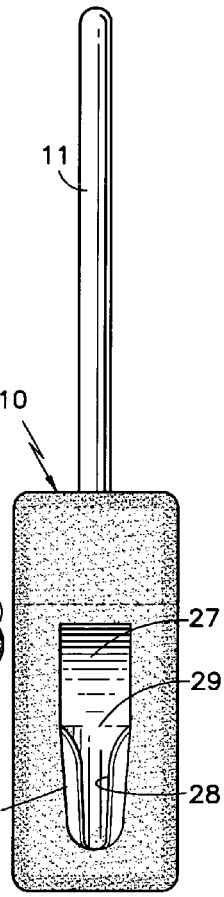
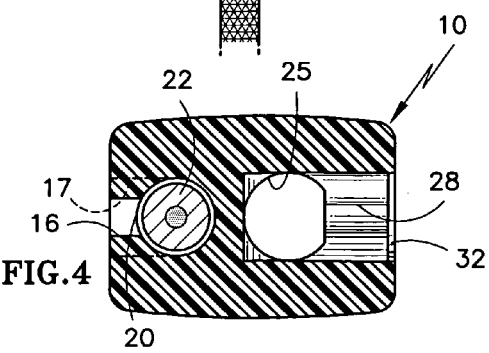

FLEXIBLE LOOP BUNGEE CORD TERMINUS

TECHNICAL FIELD

This invention relates to a bungee cord terminus which has a flexible loop, one end fixed to the terminus, the other end being engageable to the terminus and releasable from the terminus, thereby to provide secure fastening through or about an anchor point.

BACKGROUND ART

Bungee cords are extremely common, and used in a variety of ways. The most simple and common bungee cord terminus is a stiff wire hook which is crimped to the end of the bungee cord. One form of terminus, as illustrated in U.S. Pat. No. 6,851,163 is adjustable. A variety of other forms are known to provide a variety of features to suit different applications.

DISCLOSURE OF INVENTION

Objects of the invention include: a bungee cord terminus which is extremely secure when in place; a flexible bungee cord terminus which may reliably engage a variety of anchors; and an improved bungee cord terminus.

According to the present invention, a bungee cord terminus includes a flexible loop having one end secured to the terminus and a free end releasable to permit passing the flexible loop around or through an anchor point, following which the free end of the flexible loop is reengaged with the terminus.

The invention provides a bungee cord terminus which, when engaged around or through an anchor point, is secure and will not release from the anchor point.

Other objects, features and advantages of the present invention will become more apparent in the light of the following detailed description of exemplary embodiments thereof, as illustrated in the accompanying drawing.

BRIEF DESCRIPTION OF THE DRAWINGS

FIG. 1 is a sectioned, side elevation view of one form of the invention.

FIG. 2 is an elevation view of a first side of the terminus of FIG. 1.

FIG. 3 is an elevation view of a second side of the terminus of FIG. 1.

FIG. 4 is a top sectional view taken on the line A—A of FIG. 1.

MODE(S) FOR CARRYING OUT THE INVENTION

Referring to FIG. 1, a terminus 8 for a bungee cord 9 comprises a molded base 10 having a flexible loop 11 anchored therein by means of a compression sleeve 12 secured to the flexible loop 11. In a preferred embodiment of the invention, the flexible loop 11 comprises steel cable, such as ⅛ inch 7×7 aircraft cable, or ⅛ inch 7×19 aircraft cable, coated with vinyl or other suitable plastic to an overall diameter on the order of 3/16 inch. Instead of a compression sleeve, the loop 11 could be bent and then molded into the base 10. The loop may be on the order of between eight inches and twelve inches long, or of such other length as is found suitable in any implementation of the present invention.

The base 10 has a slot 15 having a narrow upper portion 16 and an enlarged lower portion 17. An opening 20 at the end of the enlarged portion 17 allows passage of a compression sleeve 22 crimped to the free end 23 of the loop 11.

In the embodiment disclosed herein, the position of the terminus 8 on the bungee cord 9 is adjustable, in the same fashion as disclosed in the aforementioned patent. Referring to FIGS. 1, 3 and 4, the base 10 has a cord receiving bore 25 with a cord passage 27 extending outwardly from the bore 13. A cleat 28 opens at 29 into the cord passage 27 in such a fashion that when a cord extends through the bore 25 and the passage 27 it may be pulled down into the cleat 28 as illustrated in FIG. 1, thereby locking the terminus 8 to the cord 9. A land 32 may be provided, if desired, to reduce the thickness of the cleat, to give the cleat a desired characteristic.

As shown in FIG. 1, the cord 9 may be bent upon itself and crimped with a hog ring 36, or otherwise, to prevent the terminus from slipping off the end of the cord 9.

The invention, including a base 10, a flexible loop 11, the slot 15, enlargement 17, and opening 20, may be utilized without the adjustability described with respect to items 25–32, by molding the base 10 over the end of the cord 9, after the cord 9 has a suitable hog ring or compression sleeve, or bend, to hold it in place.

The flexible loop 11 may alternatively be comprised of a non-metallic solid or braided semi-rigid plastic, either reinforced by glass or other fibers, or not. The flexible loop 11 may also comprise a suitably resilient solid metal such as spring steel; in such a case, the enlarged portion 17 of the slot 15 may be shorter, in contrast with the slot 17 shown with a compression sleeve or other enlargement on the free end 23 of the loop 11. The flexible loop may be comprised of other materials, have other enlargements on the free end, and be secured in the base 10 by means other than a compression sleeve, all such modifications being well within the skill of the art in view of the teachings herein.

As shown in FIG. 1, the base 10 has a groove 34 which may optionally be used to provide a more symmetrical mold thickness, to assist in manufacture; but the groove 34 may be omitted.

The aforementioned patent is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A bungee cord assembly comprising:
   a bungee cord terminus including:
   a base;
   a flexible loop having (a) a first end fixedly anchored at a first position within said base, and (b) a second end opposite said first end having an enlargement thereon;
   a slot at a second position within said base, said slot having an enlarged portion sufficient to receive said enlargement, said enlarged portion opening outwardly from said base, thereby to accept said enlargement within said enlarged portion, said enlargement retained in said enlarged portion with tension applied to said loop; and a bungee cord (c) permanently or (d) releasably anchored to said bungee cord terminus.

2. A bungee cord assembly comprising:

a bungee cord terminus comprising:

a base;

a flexible loop having a first end anchored at a first position within said base, and a second and opposite said first end having an enlargement thereon;

a slot at a second position within said base, said slot having an enlarged portion sufficient to receive said enlargement, said enlarged portion opening outwardly from said base, thereby to accept said enlargement within said enlarged portion, said enlargement retained in said enlarged portion with tension applied to said loop, said loop, with said enlargement retained in said enlarged portion, extending outwardly from said first and second positions along respective first and second axes; and a bungee cord (a) permanently or (b) releasably anchored to said bungee cord terminus, said bungee cord extending outwardly from said terminus along an exit axis which is substantially midway between said first and second axes.

3. A bungee cord terminus according to claim 2 wherein:

said loop comprises plastic coated steel aircraft cable.

* * * * *